United States Patent
Bregman et al.

(10) Patent No.: US 11,822,933 B2
(45) Date of Patent: *Nov. 21, 2023

(54) CONFIGURATION MANAGEMENT TASK DERIVATION

(71) Applicant: Red Hat Israel, Ltd., Raanana (IL)

(72) Inventors: Arie Bregman, Raanana (IL); Or Idgar, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 238 days.

This patent is subject to a terminal disclaimer.

(21) Appl. No.: 16/939,670

(22) Filed: Jul. 27, 2020

(65) Prior Publication Data
US 2020/0356383 A1 Nov. 12, 2020

Related U.S. Application Data

(63) Continuation of application No. 15/875,468, filed on Jan. 19, 2018, now Pat. No. 10,725,793.

(51) Int. Cl.
*G06F 15/177* (2006.01)
*G06F 9/00* (2006.01)
(Continued)

(52) U.S. Cl.
CPC ............ *G06F 9/44505* (2013.01); *G06F 8/60* (2013.01); *G06F 9/4406* (2013.01); *G06F 9/48* (2013.01); *G06F 9/45558* (2013.01)

(58) Field of Classification Search
CPC ...... G06F 9/44505; G06F 8/60; G06F 9/4406; G06F 9/48; G06F 9/45558
See application file for complete search history.

(56) References Cited

U.S. PATENT DOCUMENTS 6,842,769 B1    1/2005   Kim et al.
8,549,114 B2   10/2013   Reddy et al.
(Continued)

OTHER PUBLICATIONS

Martin Prankevich, "Using Synctool for server configuration management", HackMag.com 2017, 15 pages.
(Continued)

*Primary Examiner* — Xuxing Chen
(74) *Attorney, Agent, or Firm* — Lowenstein Sandler LLP

(57) ABSTRACT

Systems and methods are disclosed for derivation of executable tasks for synchronizing configuration parameters. An example method may comprise: obtaining a first set of configuration parameters of a first computer system corresponding to a first time value; obtaining a second set of configuration parameters of the first computer system corresponding to a second time value; performing a comparison between the first set of configuration parameters and the second set of configuration parameters to determine one or more differences; deriving in view of the comparison, one or more executable tasks to convert the first set of configuration parameters to the second set of configuration parameters; and providing, to a second computer system, the one or more executable tasks for execution by the second computer system to synchronize configuration parameters of the second computer system to configuration parameters of the first computer system corresponding to the second time value.

20 Claims, 9 Drawing Sheets

(51) Int. Cl.
  *G06F 9/24* (2006.01)
  *G06F 9/445* (2018.01)
  *G06F 9/48* (2006.01)
  *G06F 9/4401* (2018.01)
  *G06F 8/60* (2018.01)
  *G06F 9/455* (2018.01)

(56) References Cited

U.S. PATENT DOCUMENTS

| | | | |
|---|---|---|---|
| 9,183,062 B2 | 11/2015 | Balani et al. | |
| 9,747,178 B2 | 8/2017 | Sridhara | |
| 2005/0005162 A1 | 1/2005 | Oliphant | |
| 2008/0235611 A1 | 9/2008 | Fraley et al. | |
| 2009/0319653 A1 | 12/2009 | Lorenz et al. | |
| 2013/0102963 A1* | 4/2013 | Marsh | G06F 9/44505 604/151 |
| 2015/0254067 A1 | 9/2015 | Nigam | |
| 2016/0112252 A1 | 4/2016 | Notari | |
| 2018/0225352 A1* | 8/2018 | Purushothaman | G06F 16/278 |
| 2020/0050130 A1* | 2/2020 | Cohen | G03G 15/6529 |

OTHER PUBLICATIONS

Microsoft, "Automatic syncing of configuration changes between 2 DHCP failover servers", Script Center, 2014, 10 pages.
Orca, "WebSphere Application Server Configuration Management", OrcaConfig.com, 7 pages.
Chris Lewis, "Automatically sync RADIUS configuration across multiple Domain Controllers", Server Space, Dec. 4, 2014, 4 pages.
USPTO, Office Action for U.S. Appl. No. 15/875,468, dated Nov. 27, 2019.
USPTO, Notice of Allowance for U.S. Appl. No. 15/875,468, dated Mar. 20, 2020.

* cited by examiner

CONFIGURATION MANAGEMENT TASK DERIVATION

RELATED APPLICATION

The present Application is a Continuation of U.S. patent application Ser. No. 15/875,465, filed on Jan. 10, 2018, which is incorporated herein by reference in its entirety for all purposes.

TECHNICAL FIELD

The present disclosure is generally related to computer systems, and is more specifically related to derivation of tasks for modifying configuration parameters of computer systems.

BACKGROUND

A computer system, such as a physical server or a virtual machine running on a physical server, may run multiple applications. Each of those applications, as well as the underlying operating system and hardware, may have numerous configuration parameters designed to affect various aspects of the hardware, operating system, and/or application performance. The configuration parameters may change over time.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
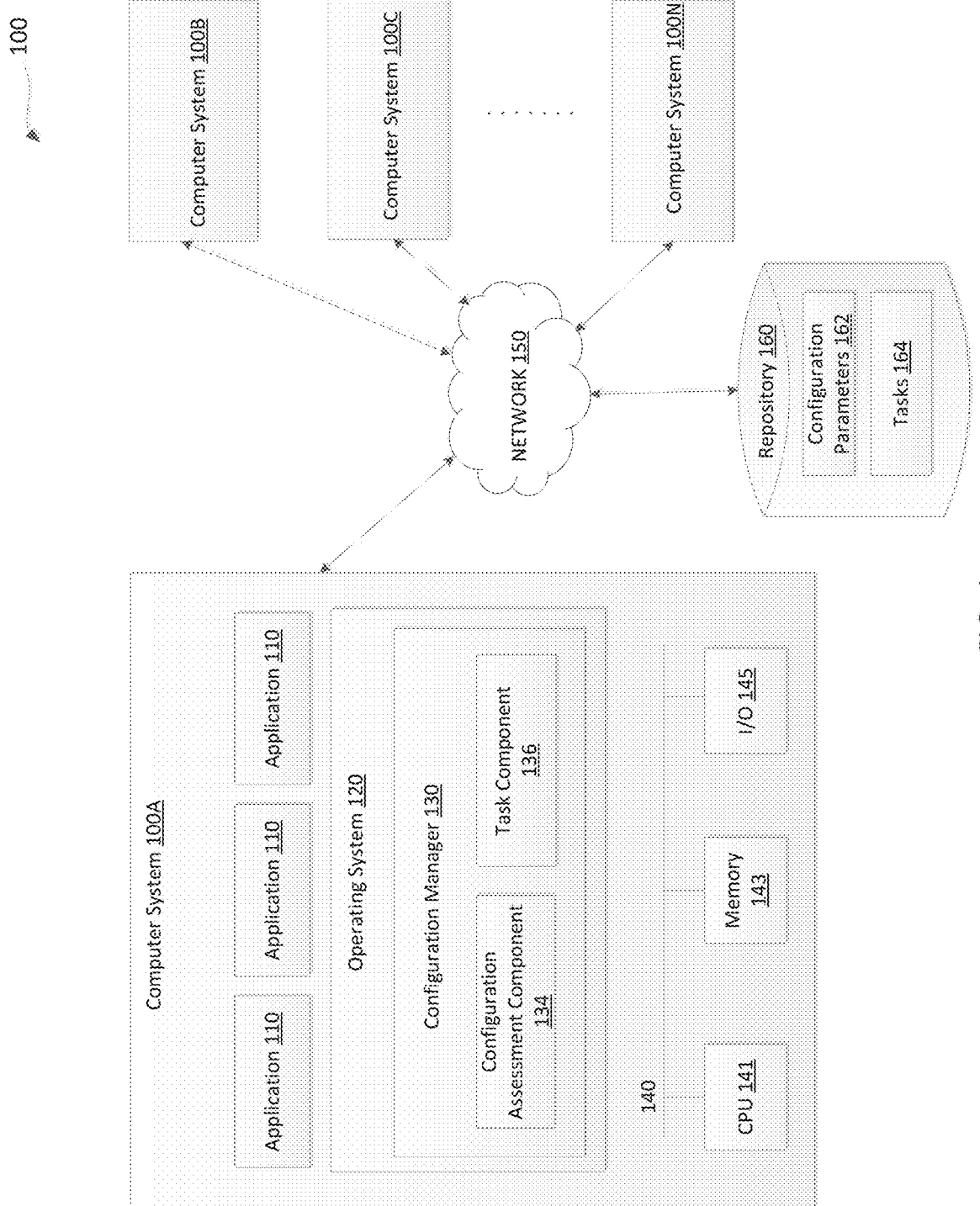
FIG. 1 depicts a high-level block diagram of an example computer system architecture, in accordance with one or more aspects of the present disclosure.

Described herein are methods and systems for derivation of tasks for modifying configuration parameters of computer systems. A computer system may include hardware, software, applications, operating systems, and virtual machines, each of which may have numerous configuration parameters designed to control various operational aspects of the respective hardware, software, applications, operating systems, and/or virtual machines. A configuration management tool (e.g., Ansible™, Puppet™, Chef™, etc.) may be employed to manage and modify the configuration parameters of a computer system.

In certain scenarios, it may be desirable to synchronize a set of configuration parameters to another set of configuration parameters. For example, one or more servers in a data center may need to be synchronized with the configuration state of another server for a data center wide synchronization. In another example, during an upgrade of computer systems or one or more particular applications, several configuration changes may be made to a reference computer system selected from a group of computer systems. In another example, various configuration modifications may be performed, while some may be reverted back, on a reference computer system to troubleshoot a particular issue, or to find the best solution to a problem. It may be desired to understand the difference between a working computer system and a non-working computer system. In the above examples and in other scenarios, a user (e.g., a system administrator) may manually keep track of the changes applied to the reference computer system to apply the same changes to the remaining target computer systems in the group. The user may have to manually keep track of a large number of configuration changes, for example, when the computer system supports numerous applications or goes through an upgrade of a massive scale. The user may have to also manually apply the same changes to the remaining computer systems. A user may manually compare configurations of two computer systems to identify what modifications need to be made. A user may write configuration scripts in compatible formats for each of the computer systems to make configuration changes in batches. Manual tracking, modification, comparison, scripting, etc. leads to errors, inaccuracy, inefficiency, and wastage of resource.

An effort may be made to plan ahead of time to record modification commands applied to a particular computer system and apply the recorded commands to other computer systems. In many cases, it may not be possible, practical, or desirable to record or keep track of the changes at the time they are being made, such as, during an emergency maintenance, troubleshooting, incremental modifications based on previous modification results, etc. In these and other situations, manual tracking and/or recorded modifications to a particular reference system fail to provide a solution. Additionally, it may be desirable to apply changes that were made only during a subset of the time period out of a total time period of upgrade to the reference server. It may be desirable to select a random computer system as a reference computer system. Recorded modification commands from a particular reference computer system fail to provide for selecting a random start time and end time for the desired time period, or for selecting a random computer system as reference after the modifications have already been recorded with particular start/end times or reference computer systems.

Aspect of the present disclosure address the above and other deficiencies by providing technology that compares sets of configuration parameters to automatically derive executable tasks to synchronize the sets of configuration parameters. For example, the technology may provide for deriving executable tasks for synchronization between two computer systems based on differences in configuration parameters of the two computer systems. In another example, the technology may provide for synchronization between a reference computer system and a target computer system based on differences in configuration parameters of the reference computer system at a start time and an end time. In yet another example, the technology may provide for synchronization between configuration parameters of a reference computer at two times based on differences in configuration parameters of the reference computer system at a start time and an end time.

In an implementation, configuration parameters of computer systems may be collected and saved in one or more data repositories from which the parameters may be obtained for comparison. Examples of configuration parameters may include, but are not limited to, an entity type (e.g., package, service, user, group, configuration file, network interface settings, SELinux settings, security settings, or firewall settings, etc.,), parameter name (e.g., zlib, CUPS, etc.), parameter state (e.g., present, absent, disabled, etc.), password, path, domain, version, choices, etc. A configuration management tool, also known as a configuration manager (e.g., Ansible™), may run on a computer system (e.g., a control machine). The configuration manager ("CM") may be provided with identification of a reference computer system, one or more target computer systems, a specification of a first time value, a second time value, etc. through a user interface and/or a file maintained for the configuration manager. In an example, the control machine may be the same as the reference computer system or one of the target computer systems. For example, the configuration manager may run in a "server mode" where there may exist a master server with agent or agentless client environment, in which the CM resides on the master server (e.g., reference machine) and provides and/or executes changes for the client machines (e.g., target machine). In another example, the CM may run with a local mode, where the CM resides on the target machine as well as applies the changes to the same target machine. The configuration manager may obtain configuration parameters from the one or more data repositories corresponding to identified computer system(s) and/or corresponding to specified time value(s). In an example, the configuration parameter may obtain configuration data in real time from the computer systems if the data repository does not contain the data. The term "real time" may refer to operations performed instantaneously or as soon as relevant changes have occurred. In one example, a first set of configuration parameters of a reference computer system corresponding to the first time value may be compared to a second set of configuration parameters of the reference computer system corresponding to the second time value to determine one or more differences in configuration corresponding to the different times. In another example, a first set of configuration parameters of the reference computer system may be compared to a second set of configuration parameters of the target computer system to determine one or more differences in configuration of the computer systems. Based on the one or more differences, the configuration manager may automatically derive one or more executable tasks (e.g., commands, instructions, etc.) that convert the first set of configuration parameters to the second set of configuration parameters. For example, the one or more executable tasks may be derived for configuration parameters for which it is determined that one or more differences exist. The configuration manager may provide the executable task(s) to another computer system (e.g., the target compute system). For example, the configuration manager may connect to the target computer system and copy a file with the commands to the target computer system. If permissions are given, the configuration system may also execute the commands on the target computer system. In another example, the differences in configuration and the derived tasks may be provided as a patch to upgrade computer systems when the upgrades are configuration related. The difference and tasks may be used to synchronize a newly provisioned computer system (e.g., newly provisioned server machine) to the state (e.g., configuration parameter) of the reference server. The derived tasks can be used when a bug is fixed in a production server configuration, for example, by running multiple actions, and it is desired to apply the same configuration changes to all the other serves in the data center. When the tasks (e.g., commands) are executed, configuration parameters may be synchronized between a reference and a target computer system, and/or change in configuration parameters from the first time value to the second time value may be duplicated at the current time and/or to a target computer system.

The systems and methods described herein include technology that enhances the synchronization of computer system configurations. In particular, aspects of the present disclosure provide technology that enables synchronization of configurations of computer systems accurately without relying on erroneous and inefficient manual processes. In addition, by providing fast and accurate synchronization of configuration parameters, the technology reduces risk of computer system failures. The technology also provides for various options and flexibility in selecting the set of configuration parameters to synchronize with instead of relying on rigid planned and recorded commands limited to certain time period and computer system. The technology also provides for solution to apply large scale bug fixes and emergency production issues by being able to compare and derive tasks for a selectable time frame and/or computer systems. The technology also eliminates redundant task generation and reduces resource wastage by obtaining differences between the configuration parameters and limiting the derivation of tasks for the configuration parameters where differences exist. Overall, the technology reduces computing resources consumed by resource intensive processes, improving performance and accuracy of computing systems.

Various aspects of the above referenced methods and systems are described in details herein below by way of examples, rather than by way of limitation.

FIG. 1 illustrates a computer system 100 in which embodiments may operate. It should be noted that other architectures for computer system 100 (also referred to herein as system 100) are possible, and that the implementation of a computer system utilizing embodiments of the disclosure are not necessarily limited to the specific architecture depicted by FIG. 1. Terms such as "machine," "device," "computer," and "computing system" may be used interchangeably and synonymously throughout this document.

Computer system 100 may include a single computer system or multiple computer systems arranged in a heterogeneous or homogenous group (e.g., cluster). Computer system 100 may include one or more computer systems, such as computer systems 100A, 100B, 100C, through 100N in accordance with one or more aspects of the present disclosure. Computer system 100 may include computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable derivation of tasks for configuration parameter synchronization through the embodiments discussed herein. In one example, computer system 100 may include a computing device implemented with x86 hardware. In another example, computer system 100 may include a computing device implemented with PowerPC®, SPARC®, or other hardware. Computer system 100 may include one or more virtual machines and a hypervisor. In some implementations, the computer systems 100A-N are often located in a data center.

Each of the computer systems 100A-N may include hardware components 140 such as a central processing unit (CPU) 141, memory 143, and input/output interfaces (I/O) 145. Computer system 100 may include additional or different components, devices, and/or connectors in various implementations of the disclosure. Hardware components 140 may provide hardware functionality for performing computing tasks.

One or more processors may be embodied as central processing unit (CPU) 141, which can be a micro-processor, digital signal processor (DSP), or other processing component. CPU 141 may process various received data and may carry out the code or instructions or one or more computer programs, for example, to provide input/output operations specified by the instructions. CPU 141 may include one or more processors that are capable of executing the computing tasks described in the present disclosure. CPU 141 may be a single core processor that is capable of executing one instruction at a time (e.g., single pipeline of instructions) or may be a multi-core processor that simultaneously executes multiple instructions. The instructions may encode arithmetic, logical, or I/O operations. In one example, CPU 141 may be implemented as a single integrated circuit, two or more integrated circuits, or may be a component of a multi-chip module (e.g., in which individual microprocessor dies are included in a single integrated circuit package and hence share a single socket).

Memory 143 may include volatile memory devices (e.g., random access memory (RAM)), non-volatile memory devices (e.g., flash memory), ROM (read-only memory), EEPROM (electrically erasable programmable read-only memory), and/or other types of memory devices), and a storage device (e.g., a magnetic hard disk, a Universal Serial Bus [USB] solid state drive, a Redundant Array of Independent Disks [RAID] system, a network attached storage [NAS] array, etc.).

Computer system 100 may include one or more repository 160. Repository 160 may be a persistent storage that is capable of storing configuration parameters 162, tasks 164, etc. Repository 160 may be hosted by one or more storage devices, such as main memory, magnetic or optical storage based disks, tapes or hard drives, NAS, SAN, and so forth. Although depicted as separate from the computer system 100A-100N, in an implementation, the one or more repository 160 may be part of one or more of the computer systems 100A-100N. In some implementations, repository 160 may be a network-attached file server, while in other embodiments repository 160 may be some other type of persistent storage such as an object-oriented database, a relational database, a non-relational database, and so forth, that may be hosted by a server machine or one or more different machines coupled to the repository 160 via the network 150.

Input/output interface (I/O) 145 herein may be and/or include a device capable of providing an interface between a processor and an external device capable of inputting and/or outputting binary data.

In some implementations, computer system 100 may be connected to a network 150, which may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Computer systems 100A through 100N may be interconnected via network 150.

CPU 141 may execute an operating system (OS) 120, as well as sub-programs and/or applications of OS 120 to provide various features and embodiments described herein. OS 120 may support one or more applications 110 residing on the computer system 100. Applications 110 may include, for example, user application processes, virtual machines, containers and the like. Applications 110 may receive data through network 150. OS 120 may provide an abstraction layer for the resources (especially CPU 141, memory 143 and I/O devices 145) that applications 110 may control to perform their function. OS 120 typically makes these resources available to applications 110 through inter-process communication mechanisms and system calls. There may be various configuration parameters associated with Applications 110.

Implementations of the disclosure provide for derivation of tasks for modifying configuration parameters of computer systems. In one example, OS 120 may include a configuration manager 130 (e.g., Ansible™, etc.). Configuration manager 130 may be included in one or more of the computer systems 100A-100N. For example, computer system 100A may include configuration manager 130 and may be designated as control machine. In one example, configuration manager 130 may only be included in the control machine (e.g., a reference machine) and not on the other machines (e.g., target machines). Configuration manager 130 may have permission to connect (e.g., SSH access), read and/or execute tasks on other machines in the system 100 (e.g., 100B-100N) that are not designated as control machines. An example of such an environment may include Ansible™. In another example, configuration manager 130 may be included in the control machine 110A (e.g., "master") and also in the target machines 100B-100N (e.g., "agent") for a master-agent communication. An example of such an environment may include Puppet™.

In an implementation, configuration manager 130 may determine one or more differences between a first set of configuration parameters and a second set of configuration parameters. In one example, the first set of configuration parameters may be associated with a first computer system (e.g., computer system 110A) and the second set of configuration parameters may be associated with a second computer system (e.g., computer system 110B). In another example, the first set of configuration parameters may be associated with a first time value (e.g., a previous state) and the second set of configuration parameters may be associated with a second time value (e.g., a new or current state). In view of the determined differences, configuration manager 130 may derive one or more executable tasks (e.g., computer instructions, code, commands, etc.) that convert the first set of configuration parameters to the second set of configuration parameters. Configuration manager 130 provides the executable tasks to a computer system to execute and synchronize the configuration parameters.

In one implementation, configuration manager 130 may include a configuration assessment component 134 and a task component 136. Configuration manager 130 may include additional or different components and modules. Configuration assessment component 134 may collect and save configuration parameters associated with computer system 100A-100N in data repository 160, from which the parameters may be obtained for comparison. Examples of configuration parameters may include, but are not limited to, an entity type (e.g., package, service, user, group, etc.,), parameter name (e.g., zlib, CUPS, etc.), parameter state (e.g., present, absent, disabled, etc.), password, path, domain, version, choices, etc. Configuration assessment component 134 may receive identification of a reference computer system (e.g., computer system 110A), one or more target computer systems (e.g., computer system 110B), a specification of a first time value (e.g., a previous state), a second time value (e.g., a new or current state), etc. through a user interface and/or a file maintained for the configuration manager. The configuration assessment component 134 may obtain from the one or more repositories 160 configuration parameters 162 corresponding to identified computer system(s) (e.g., computer system 110A and 110B) and/or corresponding to specified time value(s). In an example, configuration assessment component 134 may obtain configuration data in real time from the computer systems if repository 160 does not contain the necessary data corresponding to the computer systems or specified times. In one example, a first set of configuration parameters may be compared to a second set of configuration parameters to determine one or more differences in configuration.

Task component 136 of the configuration manager may derive one or more executable tasks (e.g., commands, instructions, etc.), based on the differences, to convert the first set of configuration parameters to the second set of configuration parameters. For example, the one or more executable tasks may be derived for configuration parameters for which it is determined that one or more differences exist. Task component 136 may provide the executable task(s) to another computer system (e.g., the target compute system 110B). For example, task component 136 may gain access to the target computer system 110B and copy a file with the tasks to the target computer system. If permissions are given, the configuration manager may also execute the commands on the target computer system.

Computer system 100 may further include, although not specifically illustrated herein, a system bus or other communications mechanism for communicating information data, signals, and information between various components (e.g., I/O 145, memory 143, etc.) of the system 100. System bus may transfer data between components inside the system 100 utilizing one or more connections, such as parallel or serial bit connections.

Figure 2:
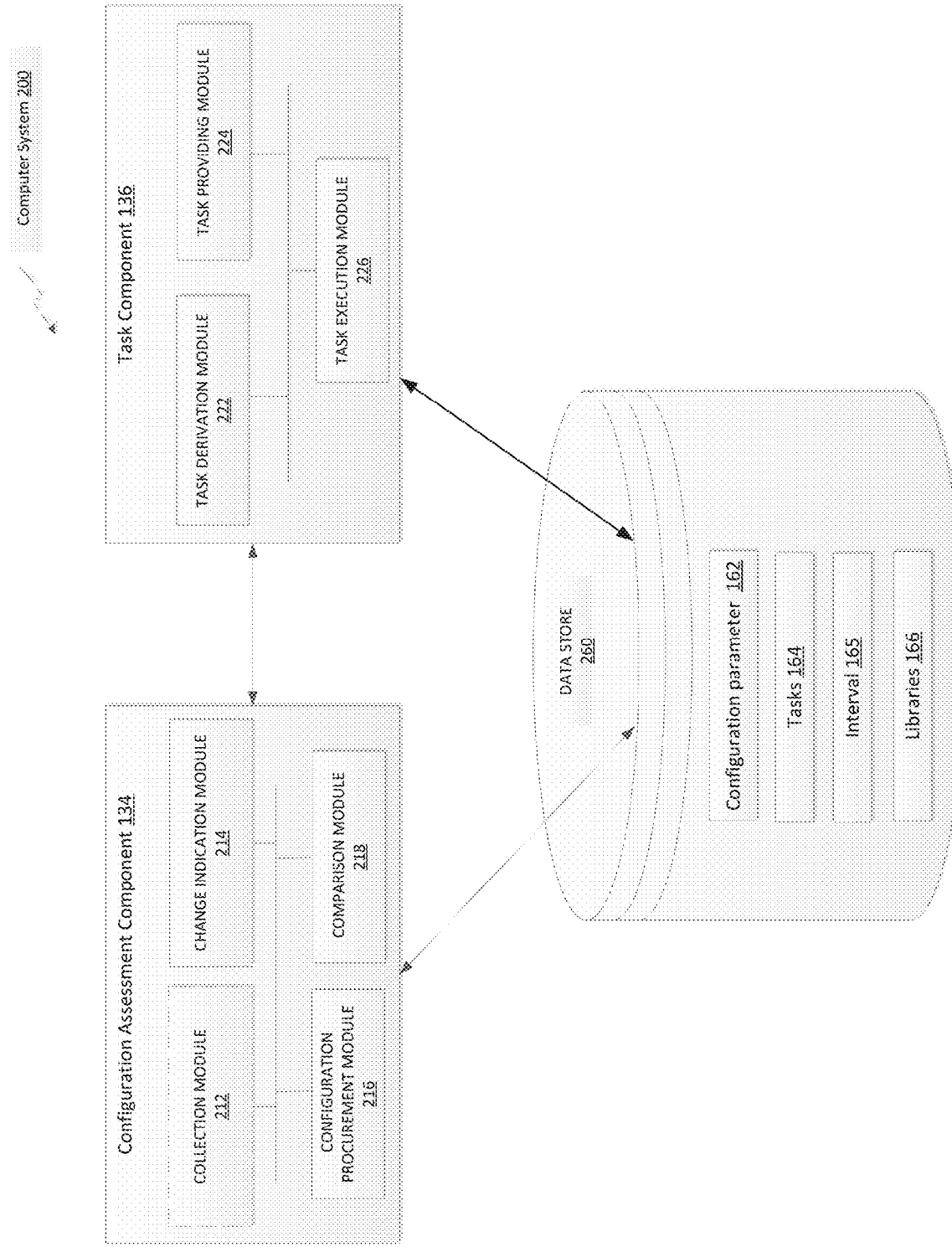
FIG. 2 depicts a block diagram of an example computer system for derivation of tasks for modifying configuration parameters of computer systems, in accordance with one or more aspects of the present disclosure.

FIG. 2 is a block diagram illustrating example components and modules of the computer system 200 in accordance with one or more aspects of the disclosure. Computer system 200 may be the same or similar to the computer system 100A-N described with respect to FIG. 1. For example, computer system 200 may include or be a control machine (e.g., a reference computer system) having the configuration manager 130. Computer system 200 may include configuration assessment component 134 and task component 136. Configuration assessment component 134 may include a collection module 212, a change indication module 214, a configuration procurement module 216, and a comparison module 218. Task component 136 may include a task derivation module 222, a task providing module 224, and a task execution module 226. Configuration assessment component 134 and a task component 136 may include additional and/or different modules and submodules. Additionally, FIG. 3 further illustrates the computer system 200 of FIG. 2 with an example implementation in accordance with one or more aspects of the present disclosure.

Computer system 200 may include a data store 260. In some implementations, the data store may be same or similar to repository 160. Data store 260 may store configuration parameters 162, tasks 164, interval 165, libraries 166, etc.

For the purposes of description with regards to FIG. 2, it is assumed that configuration manager 130, including its components and modules, may be included in computer system 100A. In one implementation of the disclosure, collection module 212 of configuration assessment component 134 may collect configuration parameters associated with computer system 100A-100N. Although collection module 212 is depicted as being included within configuration assessment component 134 in FIG. 2, collection module 212 may be separate and distinct from configuration assessment component 134 (as represented by the dotted lines). For example, collection module 212 may be a computer daemon (e.g., a computer program running as a background process). Collection module 212 may reside on the control machine (e.g., computer system 100A) where configuration manager 130 resides, or on a separate computer system having permission to read configuration data from computer system 110A. Collection module 212 may collect configuration parameters continuously, or at specified intervals, or based on some trigger (e.g., notification received about a change in a configuration parameter).

Figure 3:
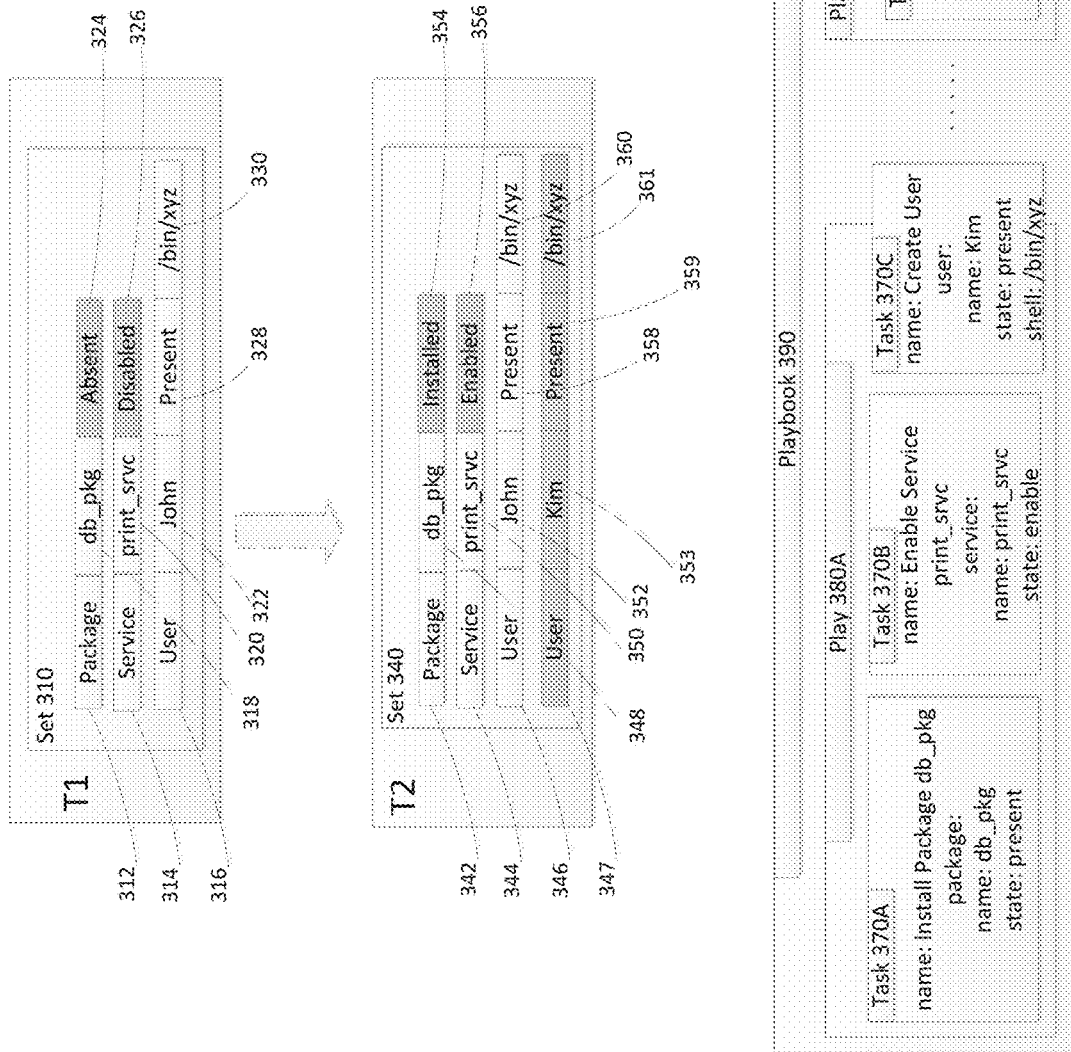
FIG. 3 depicts an example implementation of derivation of tasks based on differences between configuration parameters corresponding to different times, in accordance with one or more aspects of the present disclosure.

Examples of configuration parameters collected by collection module 212 may include, but are not limited to, an entity type (e.g., package, service, user, group, etc.,), parameter name (e.g., zlib, CUPS, etc.), parameter state (e.g., present, absent, disabled, etc.), password, path, domain, version, choices, etc. Collection module 212 may collect configuration parameters 162 and store in data store 260. For example, collection module 212 may collect configuration parameters 162 associated with computer system 100A at time T1 and store the configuration parameters 162 corresponding to time T1 in the data store 260 (as depicted in FIG. 3). Collection module 212 may have permission to collect data (e.g., configuration parameters) from multiple machines, including computer systems 100B-100N and store the data from the multiple machines in data store 260, or a different data store. For example, collection module 212 may collect data for each of the computer systems 100A through 100N and store corresponding data to a data store associated with each of the computer systems 100A through 100N.

Configuration assessment component 134 may include a change indication module 214 that receives an indication when a change has been detected for a configuration parameter. For example, change indication module 214 may receive indication from another process of computer system 100A when a configuration parameter associated with computer system 100A is changed. In one example, the indication may be sent by the process that made the change to the configuration parameter. In an example, the indication may be received for a set of configuration parameters. The indication may include identification of the set of configuration parameters that may have been changed. The set of configuration parameters may have a corresponding time value T1 (as depicted in FIG. 3) in data store 260 that indicates the last set of values of the set of configuration parameters prior to the change being made. In one example, the change indication module 214 may receive the indication at a time T2, for example, as depicted in FIG. 3. In another example, the change indication module 214 may indicate that the change was made at a time T2. Upon receiving an indication of change, configuration manager 130 may perform subsequent operations.

Configuration assessment component 134 may include a configuration procurement module 216 to obtain particular configuration parameters for further processing, such as, for comparing configuration parameters. Configuration procurement module 216 may procure configuration parameters from data store 260. In one example, configuration procurement module 216 may obtain a certain subset of configuration parameters in data store 260. In a non-limiting example, configuration procurement module 216 may obtain a subset of configuration parameters corresponding to a specific time value (e.g., T1, T2, etc.), specific computer system (e.g., computer system 100A, 100B, etc.), a plurality of computer systems in a specific group (e.g., a web group, database group, etc.), specific entity (e.g., a particular package), specific entity type (e.g., all users), etc. In some examples, the subset may be based on an input received via a user interface, such as, as it relates to identification of computer systems, time values, etc.

Configuration procurement module 216 may obtain configuration parameters continuously, after a specified interval of time, or based on a trigger. For example, configuration procurement module 216 may obtain configuration parameters being triggered by a change indication received by change indication module 214. The procurement module 216 may obtain a first set of configuration parameters corresponding to the time value T1 and a second set of configuration parameters corresponding to the time value T2, as identified from the change indication of the change indication module 214.

In another example, configuration procurement module 216 may obtain configuration parameters on a scheduled frequency to identify configuration changes made within a certain time window. For example, configuration parameters may be obtained after a specified time interval from a start time. The specified time interval may be a time period value (e.g., 5 minutes, 1 hour, etc.). The specified time interval may be associated with an end time. For example, the start time may be time value T1, the specified time interval may be 1 hour, and the end time T2 maybe 1 hour after start time, or T1+1 hour. As such, at time value T2, configuration procurement module 216 may obtain a first set of configuration parameters corresponding to time value T1, and a second set of configuration parameters corresponding to time value T2. Configuration procurement module 216 may obtain the parameters on a scheduled frequency, obtaining the next round of parameters after the specified interval where the previous end time (e.g., T2) is the new start time and the new end time is at the specified time interval from the new start time. The obtained parameters may be further used in the comparison module 218, as described in the present disclosure. In some examples, the specified time interval may be predefined in data store 260 as interval 165.

In some examples, the specified time interval may be configurable, for example, via a user interface.

In another example, the configuration parameters may be obtained by configuration procurement module 216 being triggered by an ad hoc request for comparison and derivation of executable tasks for synchronization of configuration parameters. The ad hoc request may be initiated via a user interface (e.g., I/O 145). The user interface may be used to identify a time value corresponding to which to obtain the configuration parameters. The user interface may be used to input a time value T1 and/or a time value T2. For example, a time value T1 may be the time value when a reference server in a data center is newly provisioned and the time value T2 may be the time value when desired configuration changes were completed to the reference server. In another example, time value T1 may be the time before upgrades to a reference computer was started, and a time value T2 may be the time when the upgrade to the reference computer was completed. In another example, time value T1 may be when an issue with a computer node was identified, and time value T2 may be a time when a successful resolution was applied to the computer node. In another example, time value T1 maybe a time when various changes were completed to a computer system, and time value T2 may be a time before any changes were applied, in a situation when downgrading one or more computer systems may be desired. In another example, time value T1 and T2 may be arbitrary and random time values.

In one example, time values T1 and/or T2 may be distinct point in time. In another example, time value T1 and/or T2 may be a range of values. In an example, configuration procurement module 216 may attempt to obtain configuration parameters corresponding to time value T1, for example, that has an exact match in data store 260. In another example, configuration procurement module 216 may attempt to obtain configuration parameters corresponding to time value T1 that matches with a time value in data store 260 within a predetermined threshold, or the closest available time value to T1.

In one implementation, configuration procurement module 216 may obtain a first set of configuration parameters of a first computer system corresponding to a first time value and a second set of configuration parameters of the first computer system corresponding to a second time value. The first set of configuration parameters may include a first number of parameters (e.g., 100 parameters) and the second set of configuration parameters may include a second number of parameters (e.g., 100 parameters). The first number and the second number may be same (e.g., both include 100 parameters) or different (e.g., first number is 100, second number is 200). For example, as illustrated in FIG. 3, a first set of configuration parameters set 310 of a first computer system 200 (e.g., computer system 100A) corresponding to time value T1 may be obtained by configuration procurement module 216. Set 310 includes parameters associated with three entity types, entity type 312 with a value of "package," entity type 314 with a value of "service," and entity type 316 with a value of "user." Examples of additional values of entity types not depicted in FIG. 3 may include "groups," "templates," "files" etc. An example entity type "package" may be associated with an Ansible™ module named "yum" used for managing packages. Set 310 includes corresponding parameter names 318, 320, and 322 for each of the three entity types, with values "db_pkg," "print_srvc," and "John," respectively. Each of the three entity types also includes corresponding parameter states 324, 326, and 328 with values "absent," "disabled," and "present," respectively. Examples of additional values of parameter states not depicted in FIG. 3 may include "installed," "enabled," "latest," "removed," etc. Each parameter may include additional information associated with it. For example, the entity type 316 includes shell path 330 with value "/bin/xyz" to identify default shell for user "John." Examples of additional information or fields not depicted in FIG. 3 may include password, path, domain ID, version, choices, etc.

In another example, as illustrated in FIG. 3, a second set of configuration parameters set 340 of the first computer system 200 (e.g., computer system 100A) corresponding to time value T2 may be obtained by configuration procurement module 216. Set 340 includes parameters associated with four entity types, entity type 342 with a value of "package," entity type 344 with a value of "service," entity type 346 with a value of "user" and another entity type 347 with a value of "user." Set 340 further includes corresponding parameter names 348, 350, 352, and 353 for each of the four entity types, with values "db_pkg," "print_srvc," "John," and "Kim," respectively. Each of the four entity types also includes corresponding parameter states 354, 356, 358, and 359 with values "installed," "enabled," "present," and "present," respectively. Entity type 346 includes shell path 360 with value "/bin/xyz" to identify default shell for user "John" and entity type 347 includes shell path 361 with value "/bin/xyz" to identify default shell for user "Kim."

Referring back to FIG. 2, comparison module 218 may perform a comparison between the first set of configuration parameters (e.g., set 310) and the second set of configuration parameters (e.g., set 340) to determine one or more differences. In one example, the comparison may take place immediately after obtaining the first and second set of configuration parameters. In an example, the comparison module may receive the first and second set of configuration parameter as input for performing the comparison. In one example, comparison module 218 may determine that the first set and the second set has the same number of parameters (e.g., both include 100 parameters). The comparison module 218 may determine that the parameters also have the same values (e.g., all 100 parameters of the first set each has the same value as each of the 100 parameters of the second set). In such a scenario, the comparison module 218 determines that no difference exist between the first and the second set. In another example, the comparison module 218 may determine that some or all of the parameters of the first set each has one or more different values than those of the second set (e.g., 25 of the 100 parameters of the first set each has some value that is different than those of the corresponding 25 of the 100 parameters of the second set). In this scenario, comparison module 218 determines that one or more differences exist between the sets and identifies the differences. In yet another scenario, the comparison module 218 may determine that the first and the second set have different numbers of parameters (e.g., first set having 100 parameters and second set having 200 parameters), and may identify the differences between these parameters (e.g., 100 or more differences).

In some examples, the one or more differences may be referred to as the "differentials." Differentials may be stored for later retrieval in order to avoid repeating, in the future, obtaining and comparison of configuration parameters for which the values have been already obtained. Differentials may be stored in data store 260. Differentials may be stored in a differentials file. Differentials may be separated by entity type, or some other criteria for ease of later retrieval. Differentials may be determined for all obtained configuration parameters, or a subset of those parameters.

In one implementation, the comparison by comparison module 218 may involve comparing each value of each parameter of the first and second set of parameters. In another implementation, the comparison may involve comparing values with corresponding entity type values, parameter names, etc. The differentials may identify differences between corresponding parameters of the same entity type, and/or parameter name.

In one implementation, as illustrated in FIG. 3, set 310 may be compared to set 340 to determine one or more differences. For example, the comparison may involve comparing entity type 312 to parameter types 342, 344, 346, and 347. Alternatively, the comparison may involve comparing parameter type 312 to only corresponding parameter type 342. Comparison module 218 may determine that entity type 342 has the same value as entity type 342. The comparison module 218 may further compare values for parameter name 318 and 348 and values for parameter states 324 and 354. As a result, the comparison module 218 may determine a first difference between the set 310 and 340, which is that the value of entity state for "db_pkg" of entity type "package" has been changed from "absent" at time T1 to "installed" at time T2.

In another example, comparison module 218 may compare each of the entity type 312-316 corresponding to time value T1 to each of the entity types 342-347 corresponding to time value T2. As a result, the comparison module may identify, as a second difference, that a new parameter with parameter type 347 has been added in the set corresponding to time value T2. In the same way, if a parameter is completely deleted, the comparison module may identify the deletion as a difference. Furthermore, a third difference may be identified as the difference between the values of entity type 314 and 344, where the corresponding value 324 has been changed from "disabled" at T1 to "enabled" at T2. Additionally, comparison module may determine that no difference exists between the parameters with entity type 316 and 346, and as such, may not have a result related to the said parameter.

Referring back to FIG. 2, Task component 136 of the configuration manager may derive one or more executable tasks, based on the differences between the parameters at different times obtained by configuration assessment component 134, to convert the first set of configuration parameters to the second set of configuration parameters. An example of the operations of task component 136 may involve creating Ansible™ tasks (e.g., commands, instructions, executable codes, etc.), plays (ordered set of tasks), and playbooks (one or more plays) using Ansible™ modules. Different modules may deal with different types of entities. Task component 136 may automatically derive the tasks without any manual intervention. In an example, each play may comprise tasks related to a certain entity type. In one example, based on the comparison module 218 determining that no difference exists between a first and second set of parameters at different times, task component 136 may not derive any task. In another example, based on the comparison module 218 determining that one or more differences exists between the sets of parameters, the task component 136 may derive tasks for the parameters having the one or more differences. Additionally, the task component 136 may also use the differentials to derive the tasks on-the-fly (e.g., instantaneously) from the results of the differentials, as the differentials may include, for each parameters for which a difference exists, the values of the parameters. Moreover, the task component 136 may apply the derived tasks to the target machine without storing the tasks in a file on the reference and/or the target machine. For example, the tasks may be derived and/or executed using volatile memory, such as random access memory.

In one implementation, as illustrated by FIG. 3, task derivation module 222 may process the results obtained from the comparison module 218 and derive task 370A, 370B, 370C, 370m, etc. A play 380A may be derived, which may include an ordered set of tasks 370A-370C. Multiple plays play 380A through 380mm (including task 370m) may be derived based on additional differences, if exists. A playbook 390 containing plays 380A through 380mm may be derived in order to organize the plays and tasks according to needs of the computer system 200. Additional playbooks may exist, although not depicted in FIG. 3.

In the example of FIG. 3, task derivation module 222 may derive the tasks based on the differences obtained from the comparison module 218. For example, comparison module 218 compared the first set 310 with three parameters to the second set 340 with four parameters, and determined three differences existed, while determining that there was no difference between the parameters with entity type 316 and 346. Thus, in view of the three differences, task derivation module 222 may derive three tasks corresponding to the obtained differentials and no task is to be derived for the parameters resulting into no differentials. In an example, task 370A may be derived in view of the first difference determined by comparison module 218. For example, based on the difference between the set 310 and 340 at times T1 and T2 for entity type "package" with parameter name "db_pkg", task derivation module may derive an executable task to convert the parameter state value from "absent" to "installed." Similarly, for entity types 314 and 344, based on the difference between parameters corresponding to time values T1 and T2, task 370B may be derived to convert parameter state value "disabled" to "enabled." Similarly, task 370C may be derived to create a new user "Kim" based on the difference obtained by comparison module 218.

Task derivation module 222 may use differentials obtained between any two sets of configuration parameters. Since differentials may be obtained between random time values T1 and T2, task derivation module 222 derives the tasks independent of any predetermined time values, reference computer system, and/or previously recorded tasks. In an example, task derivation module 222 may be able to derive the tasks using any input in the form of one or more differentials. A task may include name of the task (e.g., "Install Package"), entity type, name, state, etc. A state may indicate the action to be performed with regards to the entity. The tasks may be included in an executable file. In one implementation, task derivation module 222 may have permission to create files on computer system 100A. In some example, task derivation module 222 may use various libraries and rules, such as libraries 166 identified in data store 260. Libraries 166 may include a syntax library, logic tables, symbols, styles, formats, classes, modules, programming languages, templates, source codes, etc. In other examples, task derivation module 222 may use predefined code segments, such as, structures, classes, arrays, etc. Output values obtained from the comparison module 218 (e.g., from the differentials) may be parsed and passed to the predefined code segments by task derivation module 222. For example, a class named "package_class" may be predefined for an example entity type "package" (e.g., a predefined class for Ansible™ module named "yum" used for managing packages). If the differentials obtained from the comparison module 218 include a differential for entity type "package," the output values of the differential may be parsed and passed to the class "package_class" which may in turn derive a task appropriate for updating an entity type "package" with the values of the differential. In some implementations, different sets of code segments may be predefined to handle different types of environment (e.g., different hardware, operating system, database system, etc.). A combination of various aspects of a computing environment may be taken into consideration when predefining, organizing and using the code segments by the task derivation module 222. For example, there may be different classes for an entity type "package" between two different hardware (e.g., processor) as well as two additional classes for two different operating systems for the same entity. In one example, for a computer system having a particular processor with a particular operating system (OS), a particular class may be predefined for that combination of processor and operating system. In another example, the code segment may be designed to accept parameters identifying the type of processor and OS and use a specified portion of the code segment for the particular combination of the processor and OS. In one example, a matrix or a table may be maintained for selection of appropriate code segments based on the computing environments of the reference and/or target computer systems.

Task providing module 224 may provide the executable task(s) (e.g., tasks 370A-370m, playbook 390, etc.) to another computer system (e.g., compute system 110B, 110C, etc.). For example, task component 136 may be given access to a target computer system (e.g., computer system 110B) and copy a file containing the tasks (e.g., commands) to the target computer system. Task providing module 224 may provide the tasks to a plurality of computer systems. In an example, a target computer system, or a plurality of target computer systems may be identified via a user interface such as I/O 145. The identification may be provided in terms of host name, IP address, fqdn, server group name, list of servers identified in data store 260, etc. Tasks may be provided to target computer systems as a system patch, and/or at a scheduled frequency.

In some implementations, the configuration manager may also execute the commands on the target computer system. For example, task execution module 226, which may be a part of control computer system 100A, may be given permission to execute the tasks on a target computer system 100B.

Figure 4:
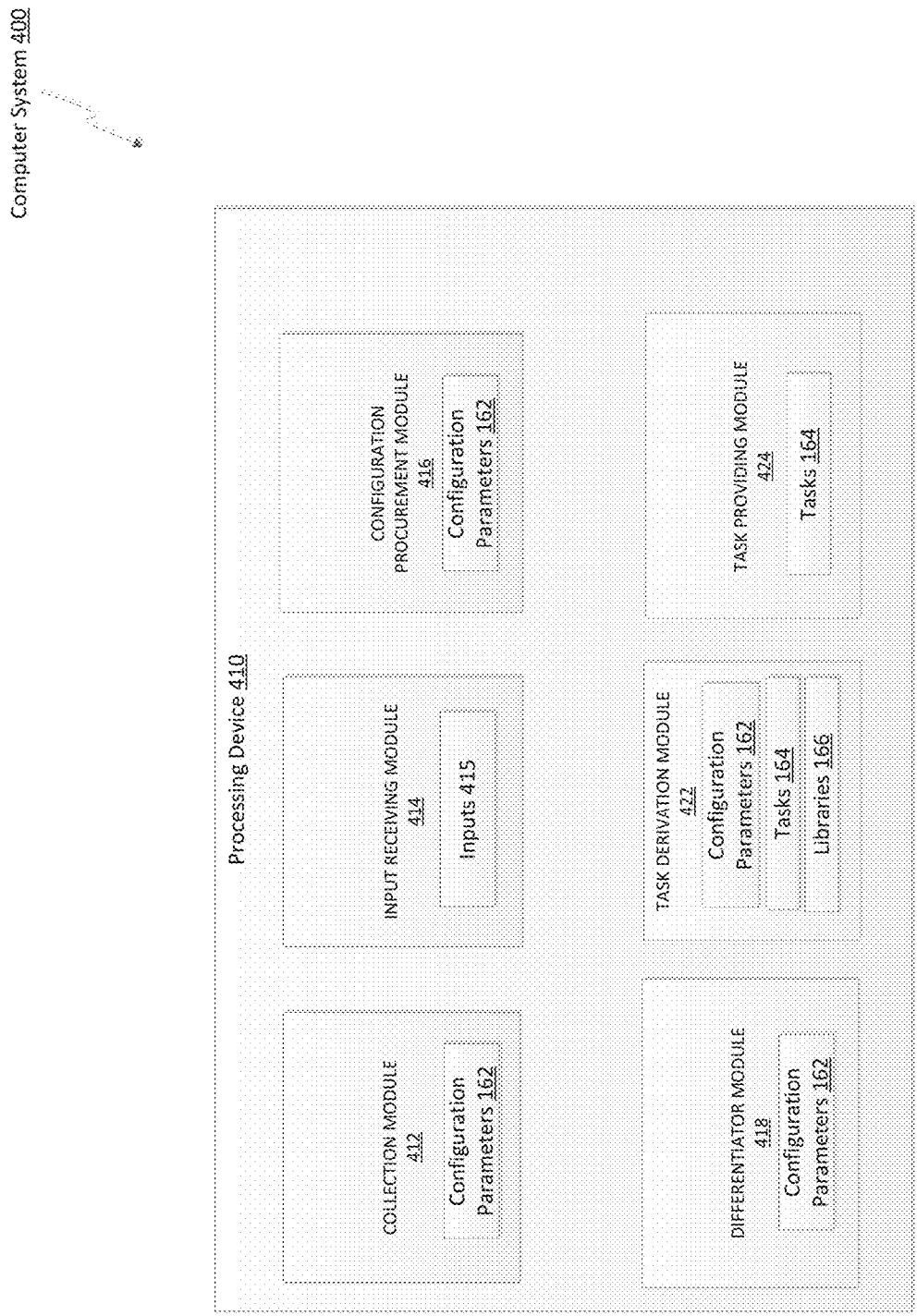
FIG. 4 depicts a block diagram of an example apparatus in accordance with one or more aspects of the present disclosure.

FIG. 4 illustrates a block diagram of an apparatus 400 to support derivation of executable tasks for synchronization of configuration parameters. The apparatus 400 may be the same or similar to components within computer system 100 of FIG. 1 or computer system 200 of FIG. 2. Apparatus 400 may be the same or similar to the computer system 100A-N described with respect to FIG. 1. In some implementations, the apparatus 400 may comprise hardware (circuitry, dedicated logic, etc.), software (e.g., software executed by a general purpose computer system or a dedicated machine), or a combination of both. In some implementations, the apparatus 400 may include processing device 410 that may execute instructions for carrying out the operations of the apparatus 400 as discussed herein. As shown, the apparatus 400 may execute instructions for a collection module 412, an input receiving module 414, a configuration procurement module 416, a differentiator module 418, a task derivation module 422, and a task providing module 424 by deriving tasks 164 to synchronize two sets of configuration parameter 162.

Components of apparatus 400 may execute instructions for carrying out operations to compare sets of configuration parameters corresponding to different time values or different computer systems. In one implementation, as depicted in FIG. 4, the operations of collection module 412, configuration procurement module 416, differentiator module 418, task derivation module 422, task providing module 424 are same as collection module 212, configuration procurement module 216, comparison module 218, task derivation module 222, and task providing module 424 of FIG. 2, respectively.

Figure 5:
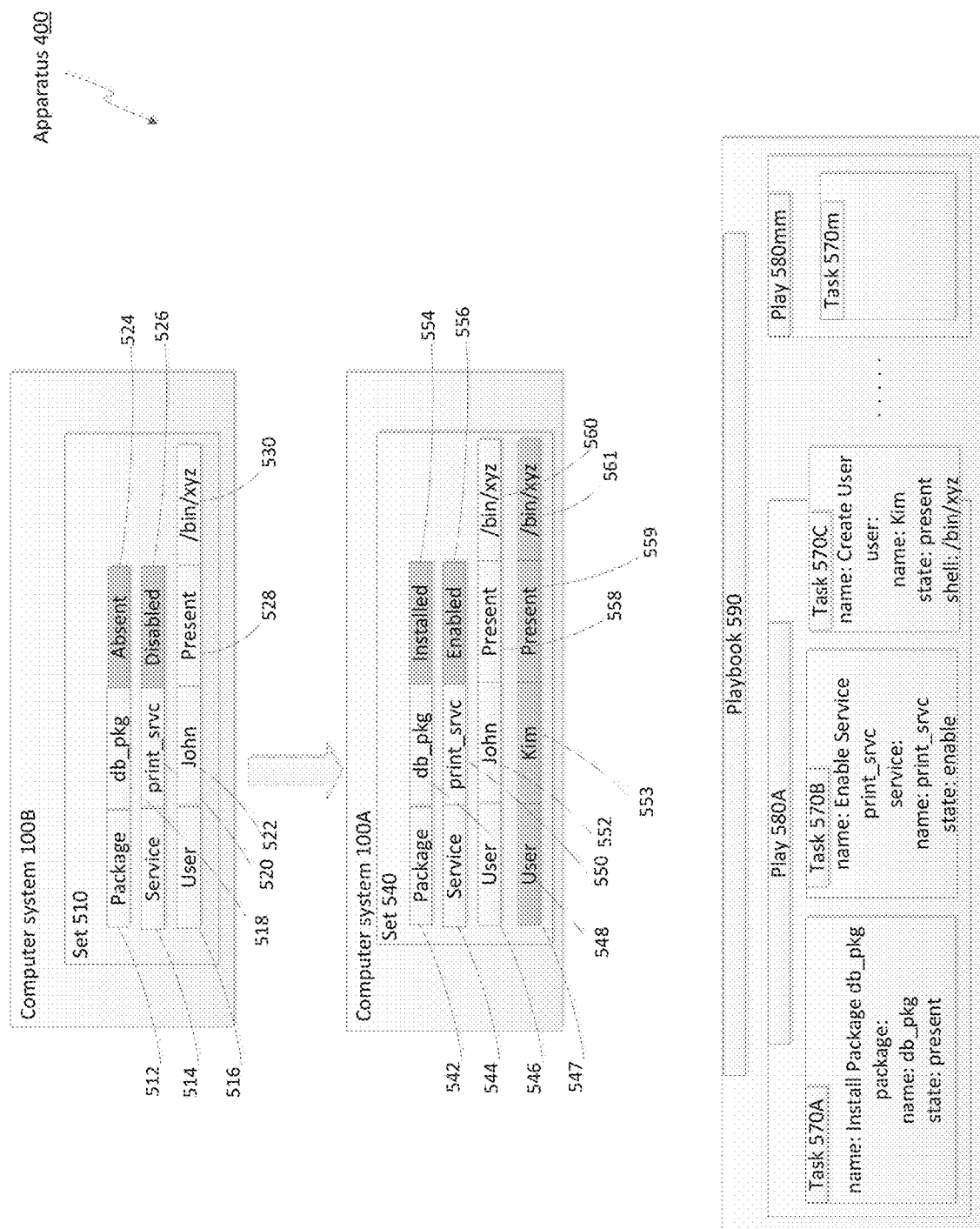
FIG. 5 depicts a flow diagram of an example implementation of derivation of tasks based on differences between configuration parameters of two computing systems, in accordance with one or more aspects of the present disclosure.

In another implementation, the components of apparatus 400 may carry out additional or different operations. For example, apparatus 400 may execute instructions to carry out operations to compare configuration parameters of two different computer systems to derive executable tasks for synchronization of configuration parameters of the two different computer systems. Additionally, FIG. 5 further illustrates the apparatus 400 of FIG. 4 with an example implementation in accordance with one or more aspects of the present disclosure. The examples in FIG. 5 are identical to those in FIG. 3, except set 510 represents configuration parameters of computer system 100B (e.g., the target computer system) instead of configuration parameters corresponding to time value T1, and set 540 represents configuration parameters of computer system 100A (e.g., the reference computer system) instead of configuration parameters corresponding to time value T2, as described in FIG. 3.

In operations of apparatus 400, the collection module 412 may collect one or more configuration parameters 162 of a first computer system 100A and a second computer system 100B. For example, collection module 412 may have permission to collect data (e.g., configuration parameters) from multiple machines, including computer systems 100B-100N

The input receiving module 414 may receive various inputs 415 used by the apparatus 400. In one example, the input may include a first time value T1 and/or a second time value T2, as described with regards to FIG. 2 and FIG. 3. In another example, the input may include an identification of a reference computer system (e.g., computer system 100A) and a target computer system (e.g., computer system 100B), where configuration parameters of the target computer system is to be synchronized with the configuration parameters of the reference computer system. Input 415 may also include more than one computing system. For example, a group of servers may be selected, such as a web server group, a database group, etc. The identification of the reference and/or target computer systems may be provided in terms of host name, IP address, fqdn, server group name, list of servers identified in data store 260, etc. Input receiving module 414 may include means (e.g., "differentiate" button, "generate tasks" button, etc.) for initiating the operations of the apparatus 400 to compare the configuration parameters corresponding to inputs 415. In an example, input 415 may be a file containing the above described types of input, such as a list of computer systems, group name, time values, etc.

Configuration procurement module 416 may obtain a first configuration parameter of the reference computer system from the one or more configuration parameters collected by collection module 412 and/or a second configuration parameter of the target computer system. For example, as illustrated in FIG. 5, a set 540 of configuration parameters of the reference computer system (e.g., computer system 100A) may be obtained by configuration procurement module 416 and a set 510 of configuration parameters of the target computer system (e.g., computer system 100B) may be obtained by configuration procurement module 416. If a configuration parameter corresponding to the reference computer or the target computer is not available, then the configuration parameters may be collected from the computer system(s) in real time and used for subsequent operations.

Differentiator module 418 may determine a difference between the set 540 of configuration parameter(s) and set 510 of configuration parameter(s). As depicted in FIG. 5, differentiator module 418 may identify a difference between the parameter states 524 to 554, as the value is changed from "Absent" in computer system 100B to "Installed" in computer system "100A."

Task derivation module 422 may derive, in view of the difference, one or more executable tasks 164 (e.g., tasks 570A-570m) for converting the configuration parameter of target computer system 100B to the configuration parameter of the reference computer system 100A. In an example, the task derivation module 422 may take a differential as an input. Since differentials may be obtained between random computer systems, task derivation module 422 derives the tasks independent of any reference computer system, previously recorded tasks, and predetermined time values. In an example, task derivation module 422 may be able to derive the tasks using any input in the form of one or more differentials.

Task providing module is for providing to one or more computer systems (e.g., 100B-100N) the one or more executable tasks 164 for execution by each of the plurality of computer systems for synchronizing configuration parameters of the plurality of computer systems to the one or more configuration parameters of the first computer system.

Figure 6:
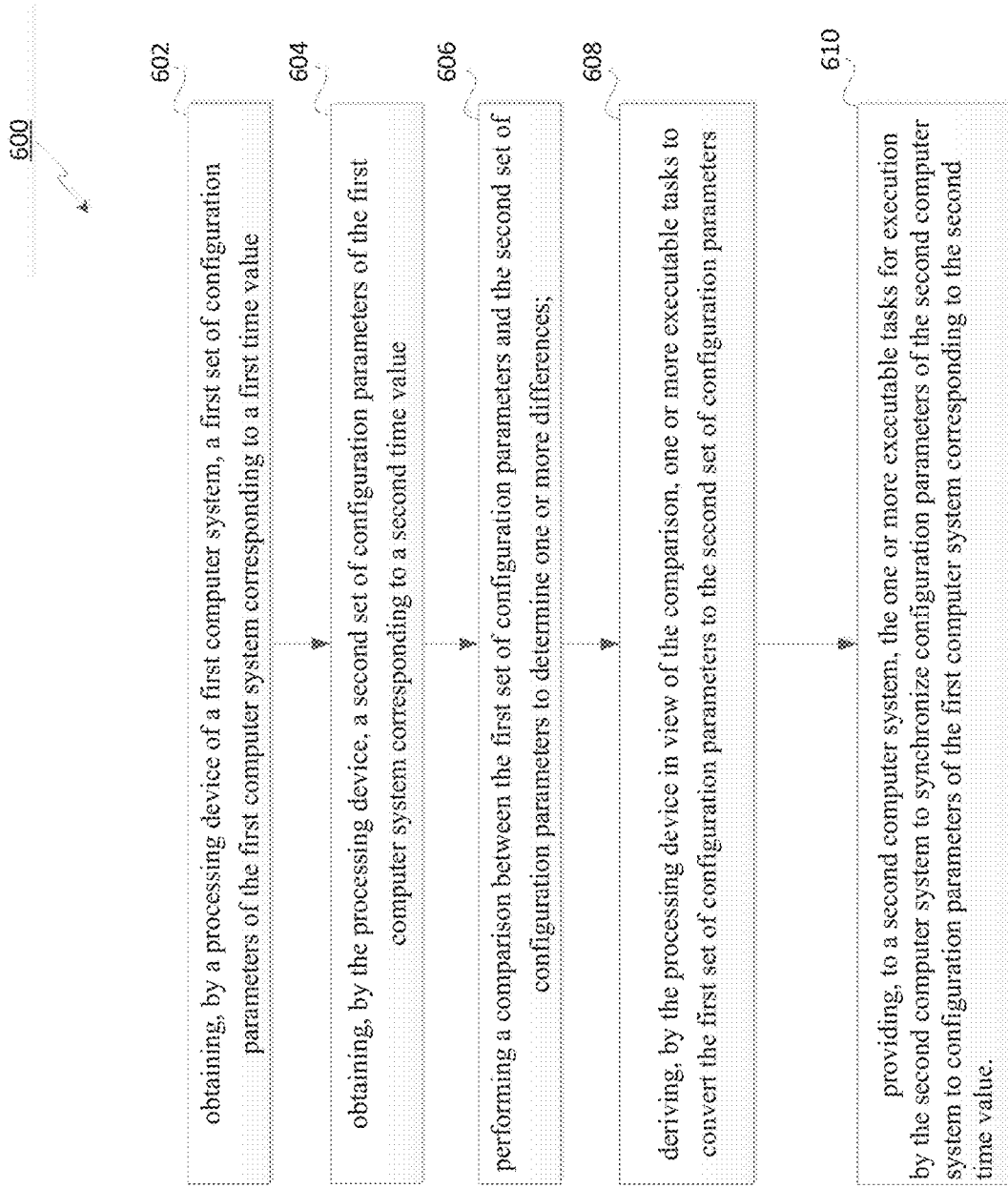
FIG. 6 depicts a flow diagram of an example method of derivation of tasks based on differences between configuration parameters corresponding to different times, in accordance with one or more aspects of the present disclosure.

FIG. 6 depicts a flow diagram of an example method 600 of derivation of tasks based on differences between configuration parameters corresponding to different times, in accordance with one or more aspects of the present disclosure. In one implementation, method 600 may be performed by the configuration manager 130 as described herein. The method 600 may be performed by processing logic that may comprise hardware (circuitry, dedicated logic, etc.), software (e.g., software executed by a general purpose computer system or a dedicated machine), or a combination of both. In alternative implementations, some or all of the method 600 may be performed by other components of the computer system 100. It should be noted that blocks depicted in FIG. 6 can be performed simultaneously or in a different order than that depicted.

Referring to FIG. 6, method 600 begins at block 602 where a first set (e.g., set 310) of configuration parameters 162 of the first computer system 100A corresponding to a first time value T1 is obtained by a processing device 141 of a first computer system 100A. At block 604, a second set (e.g., set 340) of configuration parameters 162 of the first computer system 100A corresponding to a second time value T2 is obtained by the processing device 141. In an example, the first time value T1 and the second time value T2 may be received via a user interface associated with the first computer system 100A. In an example, obtaining each of the first set 310 and the second set 340 is performed after a specified time interval 165 from a start time, the specified time interval having an end time. The start time may be the first time value T1 and/or the end time may be the second time value T2. The specified time interval may be predefined or configurable. In an example, obtaining each of the first set 310 and the second set 340 is performed after receiving an indication of a change to the first set of configuration parameters of the first computer system 100A that correspond to the first time value T1, the change corresponding to the second time value T2. Each of the first and second set of configuration parameters include one or more entity types, one or more parameter names, and one or more parameter states. Values of the one or more entity types include at least one of package, service, user, group, configuration file, network interface settings, SELinux settings, security settings, firewall settings, etc. Values of the one or more parameter states include at least one of present, installed, enabled, latest, absent, removed, or disabled.

At block 606, a comparison between the first set 310 of configuration parameters 162 and the second set 340 of configuration parameters 162 is performed to determine one or more differences. At block 608, one or more executable tasks 164 to convert the first set 310 of configuration parameters 162 to the second set 340 of configuration parameters 162 is derived by the processing device 141 in view of the comparison. At block 610, the one or more executable tasks 164 is provided to a second computer system 100B, for execution by the second computer system to synchronize configuration parameters of the second computer system to configuration parameters of the first computer system corresponding to the second time value T2.

Figure 7:
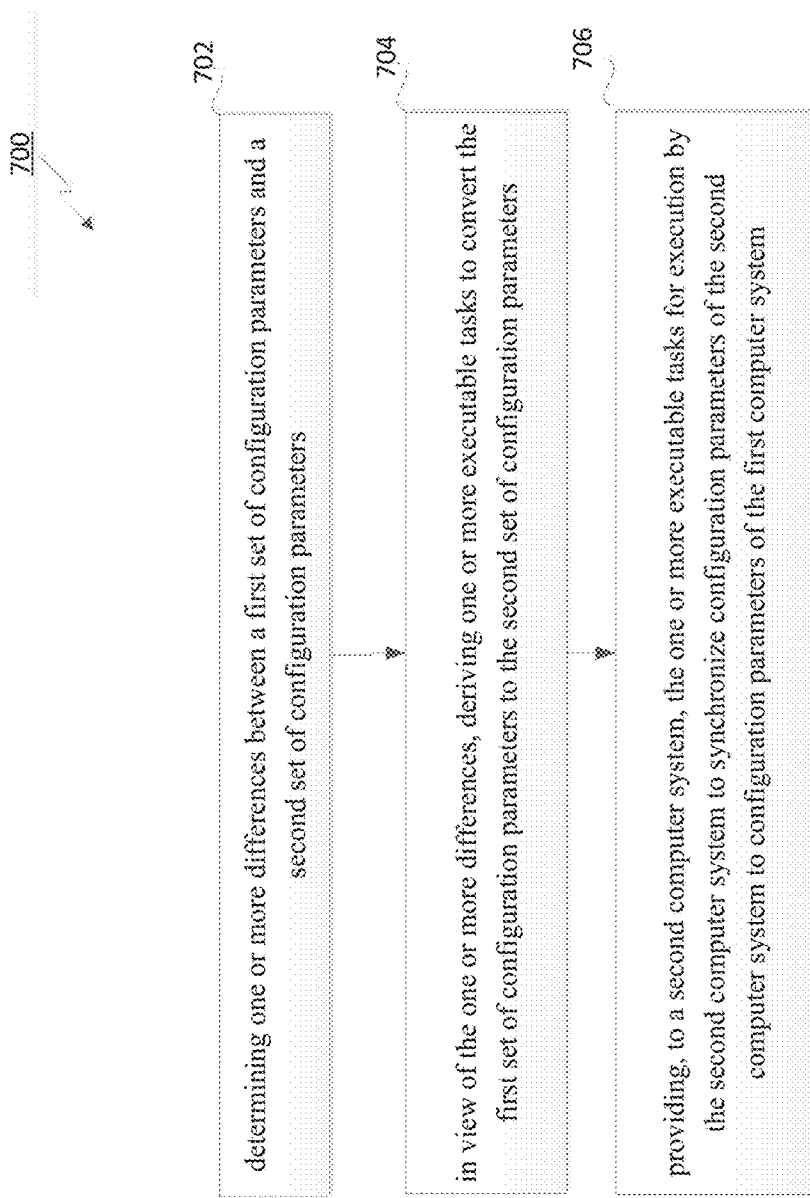
FIG. 7 depicts a flow diagram of another example method in accordance with one or more aspects of the present disclosure.

FIG. 7 illustrates depicts a flow diagram of another example method in accordance with one or more aspects of the present disclosure. The method 700 may be performed by processing logic that may comprise hardware (circuitry, dedicated logic, etc.), software (e.g., software executed by a general purpose computer system or a dedicated machine), or a combination of both. In alternative implementations, some or all of the method 700 may be performed by other components of a computer system 100. It should be noted that blocks depicted in FIG. 7 can be performed simultaneously or in a different order than that depicted.

Referring to FIG. 7, method 700 begins at block 702 where one or more differences between a first set of configuration parameters and a second set of configuration parameters are determined. In one example, the first set of configuration parameters are associated with a first computer system and the second set of configuration parameters are associated with a second computer system. In another example, the first set of configuration parameters are associated with a first time value T1 and the second set of configuration parameters are associated with a second time value T2. At block 704, in view of the one or more differences, one or more executable tasks is derived to convert the first set of configuration parameters to the second set of configuration parameters. At block 706, the one or more executable tasks are provided to a second computer system for execution by the second computer system in order to synchronize configuration parameters of the second computer system to configuration parameters of the first computer system.

Figure 8:
FIG. 8 depicts a flow diagram of another example method of derivation of additional commands for additional computer systems, in accordance with one or more aspects of the present disclosure.

FIG. 8 depicts a flow diagram of another example method of derivation of additional commands for additional computer systems, in accordance with one or more aspects of the present disclosure. The method 800 may be performed by processing logic that may comprise hardware (circuitry, dedicated logic, etc.), software (e.g., software executed by a general purpose computer system or a dedicated machine), or a combination of both. In alternative implementations, some or all of the method 800 may be performed by other components of a computer system 100, or apparatus 400. It should be noted that blocks depicted in FIG. 8 can be performed simultaneously or in a different order than that depicted.

Referring to FIG. 8, method 800 begins at block 802 where a first set of configuration parameters of a first computer system 100 A and a second set of configuration parameters of a second computer system 100B is obtained. At block 804, the first set of configuration parameters is compared to the second set of configuration parameters to determine one or more differences. At block 806, one or more executable commands are derived in view of the comparison to convert the first set of configuration parameters to the second set of configuration parameters. At block 808, the one or more executable commands are sent to a third computer system 100C for execution by the third computer system 100C. Obtaining difference between a reference computer system 100A and a target computer system 100B and then applying the derived tasks to another computer system 100C may be called a "loose mode" application. Such application may be common in data center technologies. On the other hand, obtaining difference between a reference computer system 100A and a target computer system 100B and then applying the derived tasks to the target computer system (e.g., 100B) may be called a "strict mode" application.

At block 810, an indication is received by the processing device of successful execution of commands associated with configuration parameters of the third computer system 100C. At block 812, an additional set of configuration parameters is obtained by the processing device corresponding to additional configuration parameters of the third computer system 100C. The additional configuration parameters may reflect difference between the plurality of computer systems due to, for example, applying different types of configuration changes to different machines. At block 814, the additional set of configuration parameters is compared to the second set of configuration parameters of computer system 100, to determine one or more additional differences. At block 814, one or more additional executable commands may be derived, in view of the one or more additional differences, to convert the additional set of configuration parameters to the second set of configuration parameters. At block 818, the one or more additional executable commands may be sent to the third computer system 100C for execution by the third computer system 100C, to synchronize configuration parameters of the third computer system to configuration parameters of the second computer system.

Figure 9:
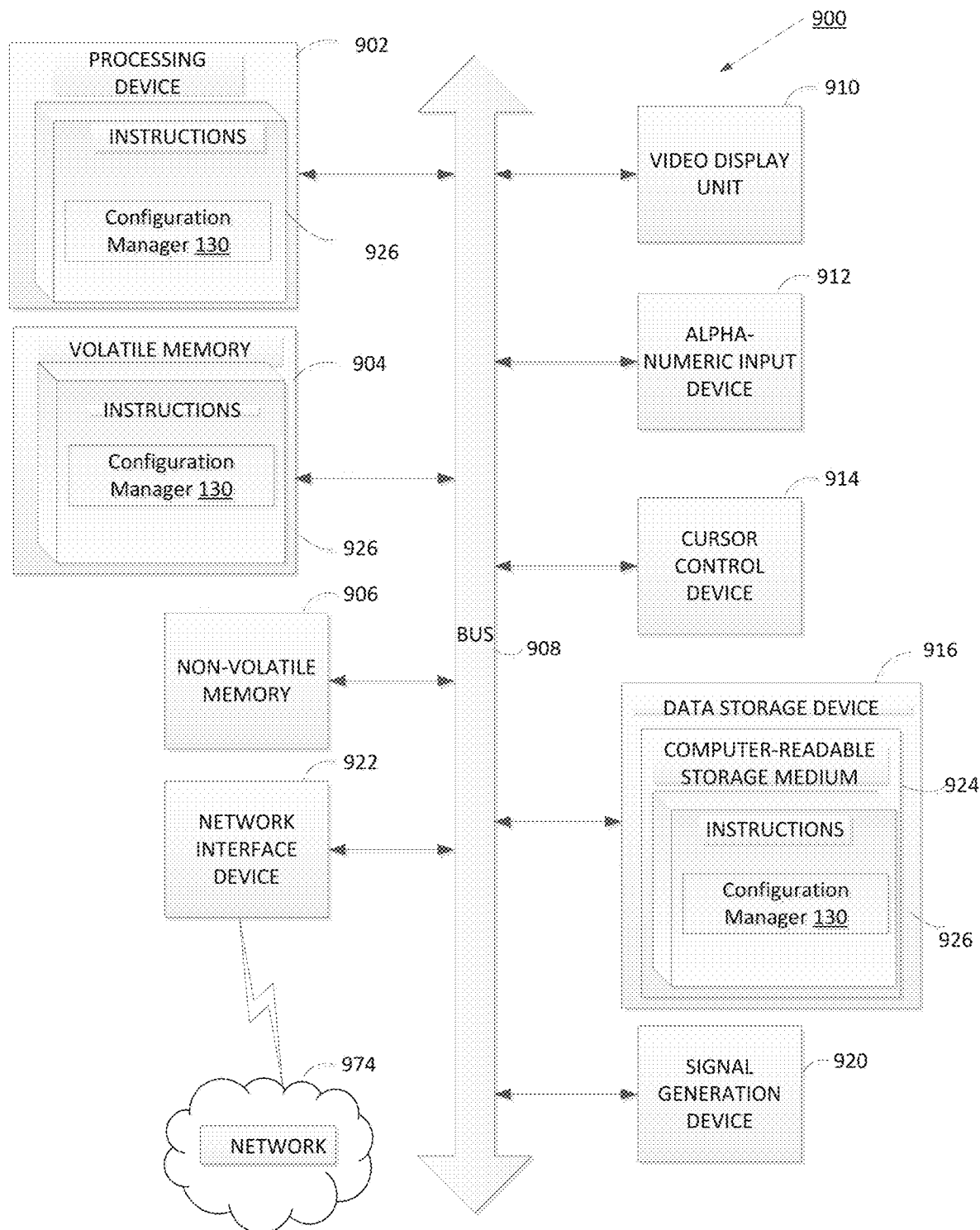
FIG. 9 depicts a block diagram of an illustrative computing device operating in accordance with the examples of the present disclosure.

FIG. 9 illustrates a diagrammatic representation of a machine in the example form of a computer system 900 within which a set of instructions, for causing the machine to perform any one or more of the methodologies discussed herein, may be executed. In various illustrative examples, computer system 900 may correspond to the apparatus 400 of FIG. 4 or the system 200 of FIG. 2. In some implementations, the computer system 900 may support derivation of executable tasks based on differences between two sets of configuration parameters.

The computer system 900 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware of the virtualized data center. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 900 may be connected (e.g., via a network, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting derivation of executable tasks based on differences between two sets of configuration parameters.

The computer system 900 includes a processing device 902, a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 916, which communicate with each other via a bus 908.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is to execute the processing logic 926 for performing the operations and steps discussed herein.

The computer system 900 may further include a network interface device 922 communicably coupled to a network 925. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

Instructions 926 may reside, completely or partially, within volatile memory 904 and/or within processing device 902 during execution thereof by computer system 900, hence, volatile memory 904 and processing device 902 may also constitute machine-readable storage medium 924. The instructions 926 may also implement the configuration manager 130 to support derivation of executable tasks based on differences between two sets of configuration parameters.

Data storage device 916 may include a computer-readable storage medium 924 (e.g., a non-transitory computer-readable storage medium) on which may store instructions 926 encoding any one or more of the methods or functions described herein.

The non-transitory machine-readable storage medium 924 may also be used to store instructions 926 to support derivation of executable tasks based on differences between two sets of configuration parameters described herein, and/or a software library containing methods that call the above applications. While the machine-accessible storage medium 924 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

It is to be understood that the above description is intended to be illustrative, and not restrictive. Many other implementations are apparent upon reading and understanding the above description. The scope of the disclosure should, therefore, be determined with reference to the appended claims, along with the full scope of equivalents to which such claims are entitled.

In the above description, numerous details are set forth. It is apparent, however, that the disclosure may be practiced without these specific details. In some instances, structures and devices are shown in block diagram form, rather than in detail, in order to avoid obscuring the disclosure.

Other computer system designs and configurations may also be suitable to implement the systems and methods described herein. The following examples illustrate various implementations in accordance with one or more aspects of the present disclosure.

Example 1 is a method comprising: obtaining, by a processing device of a first computer system, a first set of configuration parameters of the first computer system corresponding to a first time value; obtaining, by the processing device, a second set of configuration parameters of the first computer system corresponding to a second time value; performing a comparison between the first set of configuration parameters and the second set of configuration parameters to determine one or more differences; deriving, by the processing device in view of the comparison, one or more executable tasks to convert the first set of configuration parameters to the second set of configuration parameters; and providing, to a second computer system, the one or more executable tasks for execution by the second computer system to synchronize configuration parameters of the second computer system to configuration parameters of the first computer system corresponding to the second time value.

Example 2 is a method of example 1, wherein the first time value and the second time value are received via a user interface associated with the first computer system.

Example 3 is a method of example 1, wherein obtaining each of the first set and the second set is performed after a specified time interval from a start time, the specified time interval having an end time.

Example 4 is a method of example 3, wherein the start time is the first time value.

Example 5 is a method of example 3, wherein the end time is the second time value.

Example 6 is a method of example 3, wherein the specified time interval is predefined.

Example 7 is a method of example 3, wherein the specified time interval is configurable.

Example 8 is a The method of example 1, wherein each of the first and second set of configuration parameters comprise one or more entity types, one or more parameter names, and one or more parameter states.

Example 9 is a method of example 8, wherein values of the one or more entity types include at least one of package, service, user, group, configuration file, network interface settings, SELinux settings, security settings, or firewall settings.

Example 10 is a method of example 8, wherein values of the one or more parameter states include at least one of present, installed, enabled, latest, absent, removed, or disabled.

Example 11 is a method of example 1, further comprising, prior to obtaining the first set of configuration parameters and the second set of configuration parameters: collecting one or more configuration parameters of the first computer system corresponding to a time value; and storing the one or more configuration parameters to a data store associated with the first computer system.

Example 12 is a method of example 1, wherein an identification of the second computer system is specified via a user interface associated with the first computer system.

Example 13 is a method of example 1, wherein obtaining each of the first set and the second set is performed after receiving an indication of a change to the first set of configuration parameters of the first computer system that correspond to the first time value, the change corresponding to the second time.

Example 14 is a system comprising: a memory to store configuration data; a processing device of a first computer system, the processing device operatively coupled to the memory, to: receive an indication of a change to a first set of configuration parameters of the first computer system that correspond to a first time value, the change corresponding to a second time value; obtain the first set of configuration parameters corresponding to the first time value; obtain a second set of configuration parameters corresponding to the second time value; determine one or more differences between the first set of configuration parameters and the second set of configuration parameters; derive, in view of the one or more differences, one or more executable tasks to convert the first set of configuration parameters to the second set of configuration parameters; and provide to a second computer system the one or more executable tasks for execution by the second computer system to synchronize configuration parameters of the second computer system to configuration parameters of the first computer system corresponding to the second time value.

Example 15 is a system of example 14, wherein each of the first and second set of configuration parameters comprise one or more entity types, one or more parameter names, and one or more parameter states.

Example 16 is a system of example 15, wherein values of the one or more entity types include at least one of package, service, user, group, configuration file, network interface settings, SELinux settings, security settings, or firewall settings.

Example 17 is a system of example 15, wherein values of the one or more parameter states include at least one of present, installed, enabled, latest, absent, removed, or disabled.

Example 18 is a system of example 1, where the processing device is further to: prior to obtaining the first set of configuration parameters and the second set of configuration parameters, collect one or more configuration parameters of the first computer system corresponding to a time value; and store the one or more configuration parameters to a data store associated with the first computer system.

Example 19 is a system of example 14, wherein an identification of the second computer system is specified via a user interface associated with the first computer system.

Example 20 is a non-transitory computer-readable medium comprising instructions that, when executed by a processing device of a first computer system, cause the processing device to perform operations comprising: determining one or more differences between a first set of configuration parameters and a second set of configuration parameters; in view of the one or more differences, deriving one or more executable tasks to convert the first set of configuration parameters to the second set of configuration parameters; and providing, to a second computer system, the one or more executable tasks for execution by the second computer system to synchronize configuration parameters of the second computer system to configuration parameters of the first computer system.

Example 21 is a non-transitory computer-readable medium of example 20, wherein: the first set of configuration parameters are associated with the first computer system; and the second set of configuration parameters are associated with the second computer system.

Example 22 is a non-transitory computer-readable medium of example 20, wherein: the first set of configuration parameters are associated with a first time value; and the second set of configuration parameters are associated with a second time value.

Example 23 is an apparatus comprising: a processing device associated with a first computer system; means for collecting one or more configuration parameters of the first computer system; means for obtaining a first configuration parameter from the one or more configuration parameters of the first computer system and a second configuration parameter of a second computer system; means for determining a difference between the first configuration parameter and the second configuration parameter; and means for deriving, in view of the difference, one or more executable commands for converting the second configuration parameter to the first configuration parameter; and means for providing, to a plurality of computer systems, the one or more executable commands for execution by each of the plurality of computer systems for synchronizing configuration parameters of the plurality of computer systems to the one or more configuration parameters of the first computer system.

Example 24 is an apparatus of example 23, wherein each of the first and second set of configuration parameters comprise one or more entity types, one or more parameter names, and one or more parameter states.

Example 25 is an apparatus of example 24, wherein values of the one or more entity types include at least one of package, service, user, group, configuration file, network interface settings, SELinux settings, security settings, or firewall settings.

Example 26 is an apparatus of example 24, wherein values of the one or more parameter states include at least one of present, installed, enabled, latest, absent, removed, or disabled.

Example 27 is an apparatus of example 23, wherein the second configuration parameter value is obtained in real time.

Example 28 is an apparatus of example 23, further comprising means for receiving identification of the first computer system and the second computer system.

Example 29 is a non-transitory computer-readable medium comprising instructions that, when executed by a processing device of a first computer system, cause the processing device to perform operations comprising: obtaining a first set of configuration parameters of the first computer system and a second set of configuration parameters of a second computer system; comparing the first set of configuration parameters to the second set of configuration parameters to determine one or more differences; deriving, in view of the comparison, one or more executable commands to convert the first set of configuration parameters to the second set of configuration parameters; sending, to a third computer system, the one or more executable commands for execution by the third computer system; receiving an indication of successful execution of commands associated with configuration parameters of the third computer system; obtaining an additional set of configuration parameters corresponding to additional configuration parameters of the third computer system; comparing the additional set of configuration parameters to the second set of configuration parameters to determine one or more additional differences; deriving, in view of the one or more additional differences, one or more additional executable commands to convert the additional set of configuration parameters to the second set of configuration parameters; and sending, to the third computer system, the one or more additional executable commands for execution by the third computer system to synchronize configuration parameters of the third computer system to configuration parameters of the second computer system.

Example 30 is a non-transitory computer-readable medium of example 29, wherein identification of the first computer system, the second computer system, and the third computer system are received via a user interface.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "identifying," "adding," "providing," "reallocating," "generating," "receiving," "selecting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
performing a comparison between a first set of configuration parameters comprising one or more entity types and a second set of configuration parameters comprising the one or more entity types to determine a differential for each respective entity type;
deriving, by a processor executing a configuration manager on a control machine, one or more executable tasks that convert the first set of configuration parameters to the second set of configuration parameters by modifying at least one parameter state value based on the differential of at least one entity type, in view of the comparison between the first set of configuration parameters and the second set of configuration parameters; and
sending, from the configuration manager of the control machine, one or more files to a computer system to provide the one or more executable tasks for execution by the computer system to synchronize configuration parameters of the computer system to the second set of configuration parameters.

2. The method of claim 1, further comprising:
gaining access to the computer system; and
copying a file with the one or more executable tasks to the computer system for execution.

3. The method of claim 1, further comprising:
creating a file on the computer system; and
storing the one or more executable tasks in the file on the computer system.

4. The method of claim 1, further comprising:
executing the one or more executable tasks on the computer system.

5. The method of claim 1, wherein deriving the one or more executable tasks comprises deriving the one or more executable tasks using a volatile memory without storing the one or more executable tasks on the computer system.

6. The method of claim 1, wherein deriving the one or more executable tasks comprises:
deriving the one or more executable tasks in view of a set of rules and libraries.

7. The method of claim 1, wherein deriving the one or more executable tasks comprises:
deriving the one or more executable tasks in view of one or more predefined code segments.

8. The method of claim 1, wherein deriving the one or more executable tasks comprises:
obtaining an output comprising one or more differences between the first set of configuration parameters and the second set of configuration parameters;
parsing the output to obtain values corresponding to the one or more differences between the first set of configuration parameters and the second set of configuration parameters; and passing the obtained values to one or more predefined code segments to derive the one or more executable tasks.

9. The method of claim 1, wherein deriving the one or more executable tasks comprises:
selecting a predefined code segment from a table identifying a set of code segments corresponding to a number of combinations of properties of computing environments, wherein the selection is in view of a particular computing environment of the computer system.

10. A system comprising:
a memory to store configuration data;
a processing device, the processing device operatively coupled to the memory, to:
perform a comparison between a first set of configuration parameters comprising one or more entity types and a second set of configuration parameters comprising the one or more entity types to determine a differential for each respective entity type;
derive, by a configuration manager running on a control machine, one or more executable tasks that convert the first set of configuration parameters to the second set of configuration parameters by modifying at least one parameter state value based on the differential of at least one entity type, in view of the comparison between the first set of configuration parameters and the second set of configuration parameters; and
send, from the configuration manager of the control machine, one or more files to a computer system to provide the one or more executable tasks for execution by the computer system to synchronize configuration parameters of the computer system to the second set of configuration parameters.

11. The system of claim 10, wherein the processing device is further to:
gain access to the computer system; and
copy a file with the one or more executable tasks to the computer system for execution.

12. The system of claim 10, wherein the processing device is further to:
create a file on the computer system; and
store the one or more executable tasks in the file on the computer system.

13. The system of claim 10, wherein the processing device is further to:
execute the one or more executable tasks on the computer system.

14. The system of claim 10, wherein to derive the one or more executable tasks, the processing device is further to:
derive the one or more executable tasks in view of a set of rules and libraries.

15. The system of claim 10, wherein to derive the one or more executable tasks, the processing device is further to:
derive the one or more executable tasks in view of one or more predefined code segments.

16. The system of claim 10, wherein to derive the one or more executable tasks, the processing device is further to:
obtain an output comprising one or more differences between the first set of configuration parameters and the second set of configuration parameters;
parse the output to obtain values corresponding to the one or more differences between the first set of configuration parameters and the second set of configuration parameters; and
pass the obtained values to one or more predefined code segments to derive the one or more executable tasks.

17. The system of claim 10, wherein to derive the one or more executable tasks, the processing device is further to:
select a predefined code segment from a table identifying a set of code segments corresponding to a number of combinations of properties of computing environments, wherein the selection is in view of a particular computing environment of the computer system.

18. A non-transitory computer-readable medium comprising instructions that, when executed by a processing device, cause the processing device to perform operations comprising:
performing a comparison between a first set of configuration parameters comprising one or more entity types and a second set of configuration parameters comprising the one or more entity types to determine a differential for each respective entity type;
deriving, by a processor executing a configuration manager on a control machine, one or more executable tasks that convert the first set of configuration parameters to the second set of configuration parameters by modifying at least one parameter state value based on the differential of at least one entity type, in view of the comparison between the first set of configuration parameters and the second set of configuration parameters; and
sending, from the configuration manager of the control machine, one or more files to a computer system to provide the one or more executable tasks for execution by the computer system to synchronize configuration parameters of the computer system to the second set of configuration parameters.

19. The non-transitory computer-readable medium of claim 18, wherein the processing device to perform further operations comprising:
gaining access to the computer system; and
copying a file with the one or more executable tasks to the computer system for execution.

20. The non-transitory computer-readable medium of claim 18, wherein the processing device to perform further operations comprising:
creating a file on the computer system; and
storing the one or more executable tasks in the file on the computer system.

* * * * *